US011407382B2

(12) United States Patent
Salter et al.

(10) Patent No.: US 11,407,382 B2
(45) Date of Patent: Aug. 9, 2022

(54) AUTOMATED VEHICLE WINDSHIELD WIPER SYSTEMS FOR MINIMIZING THE BUILDUP OF FROZEN PRECIPITATION

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Paul Kenneth Dellock, Northville, MI (US); Aaron Halonen, Brighton, MI (US); Daniel J. Martin, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 416 days.

(21) Appl. No.: 16/518,037

(22) Filed: Jul. 22, 2019

(65) Prior Publication Data

US 2021/0024037 A1 Jan. 28, 2021

(51) Int. Cl.
*B60S 1/08* (2006.01)
(52) U.S. Cl.
CPC .............. *B60S 1/0807* (2013.01); *B60S 1/08* (2013.01); *B60S 1/0866* (2013.01)
(58) Field of Classification Search
CPC ............. B60S 1/08; B60S 1/42; B60S 1/0807
See application file for complete search history.

(56) References Cited

U.S. PATENT DOCUMENTS

| | | | |
|---|---|---|---|
| 3,729,616 A | 4/1973 | Gruss et al. | |
| 3,752,348 A | 8/1973 | Dickason et al. | |
| 4,866,359 A * | 9/1989 | Schmid | B60S 1/0818 318/471 |
| 5,263,759 A | 11/1993 | Brodie et al. | |
| 5,412,833 A | 5/1995 | Hayden | |
| 7,256,565 B2 * | 8/2007 | Merkel | B60S 1/0814 318/443 |
| 7,309,970 B2 | 12/2007 | Gao | |
| 7,983,803 B2 | 7/2011 | Willey et al. | |
| 8,541,732 B2 | 9/2013 | Rothenhaeusler | |
| 8,941,344 B2 | 1/2015 | Wilson | |
| 9,421,946 B2 | 8/2016 | Dangler et al. | |
| 9,758,129 B2 * | 9/2017 | Crombez | B60S 1/0896 |
| 9,963,112 B2 * | 5/2018 | Shami | B60S 1/0837 |

(Continued)

FOREIGN PATENT DOCUMENTS

| | | |
|---|---|---|
| CN | 206579603 U | 10/2017 |
| DE | 102013216883 A1 | 2/2015 |

(Continued)

*Primary Examiner* — Michael D Jennings
(74) *Attorney, Agent, or Firm* — Vichit Chea; Carlson, Gaskey & Olds, P.C.

(57) ABSTRACT

This disclosure details vehicle windshield wiper systems and methods for controlling windshield wipers in a manner that reduces the buildup of frozen precipitation on the vehicle windshield. In exemplary embodiments, a windshield wiper can be automatically commanded to wipe a windshield at a pre-calculated wiping interval rate when precipitation is detected on a vehicle surface, a vehicle ambient temperature is below a predefined ambient temperature threshold, and a vehicle interior temperature exceeds a predefined interior temperature threshold.

20 Claims, 4 Drawing Sheets

(56) References Cited

U.S. PATENT DOCUMENTS

| | | | | |
|---|---|---|---|---|
| 2007/0194735 A1* | 8/2007 | Gao | ........................ | B60S 1/08 |
| | | | | 318/443 |
| 2009/0254219 A1* | 10/2009 | Willey | .................. | B60S 1/0818 |
| | | | | 700/275 |
| 2013/0274971 A1* | 10/2013 | Takahashi | ............... | B60L 3/108 |
| | | | | 701/22 |
| 2020/0156593 A1* | 5/2020 | Boss | ..................... | B60S 1/3463 |

FOREIGN PATENT DOCUMENTS

| | | |
|---|---|---|
| EP | 2125454 A1 | 12/2009 |
| KR | 101259323 B1 | 5/2013 |
| WO | 2008/080651 A1 | 7/2008 |

* cited by examiner

AUTOMATED VEHICLE WINDSHIELD WIPER SYSTEMS FOR MINIMIZING THE BUILDUP OF FROZEN PRECIPITATION

TECHNICAL FIELD

This disclosure relates to vehicle windshield wiper systems, and more particularly to windshield wiper systems and associated methods for automatically controlling the windshield wipers in a manner that reduces the buildup of precipitation on the vehicle windshield.

BACKGROUND

Vehicle windshield wiper systems include one or more windshield wipers for clearing the windshield of precipitation. When not in use, the windshield wipers are typically stored in a rest position where they extend along a lower windshield cowl area. At this position, the windshield wipers can freeze to the windshield during inclement weather.

SUMMARY

A windshield wiper system according to an exemplary aspect of the present disclosure includes, among other things, a windshield wiper, a sensor system configured to (1) detect precipitation on a vehicle surface, (2) monitor a vehicle ambient temperature, and (3) monitor a vehicle interior temperature, and a control module configured to automatically command the windshield wiper to wipe at a pre-calculated wiping interval rate when the precipitation is detected on the vehicle surface, the vehicle ambient temperature is below a predefined ambient temperature threshold, and the vehicle interior temperature exceeds a predefined interior temperature threshold.

In a further non-limiting embodiment of the foregoing system, the vehicle surface is a front or rear windshield.

In a further non-limiting embodiment of either of the foregoing systems, the sensor system includes a precipitation sensor configured to detect the precipitation, an external temperature sensor configured to detect the vehicle ambient temperature, and an internal temperature sensor configured to detect the vehicle interior temperature.

In a further non-limiting embodiment of any of the foregoing systems, the system includes a wiper actuator for moving the windshield wiper at the pre-calculated wiping interval rate and a power source for powering the wiper actuator.

In a further non-limiting embodiment of any of the foregoing systems, the control module is configured to automatically command movement of the windshield wiper from a rest position to a parked position when the precipitation is detected on the vehicle surface and the vehicle ambient temperature is below a predefined ambient temperature threshold.

In a further non-limiting embodiment of any of the foregoing systems, the control module is configured to automatically reduce the pre-calculated wiping interval rate as the vehicle interior temperature decreases.

In a further non-limiting embodiment of any of the foregoing systems, the system includes a weather forecast data device configured to provide live weather forecast data to the control module.

In a further non-limiting embodiment of any of the foregoing systems, the system includes a global positioning system (GPS) configured to provide vehicle location data to the control module.

In a further non-limiting embodiment of any of the foregoing systems, the windshield wiper includes multiple windshield wipers.

In a further non-limiting embodiment of any of the foregoing systems, the pre-calculated wiping interval rate is based on the vehicle interior temperature.

In a further non-limiting embodiment of any of the foregoing systems, the pre-calculated wiping interval rate is based on a precipitation rate detected by a precipitation sensor of the sensor system.

In a further non-limiting embodiment of any of the foregoing systems, the pre-calculated wiping interval rate is correlated to the vehicle interior temperature in a look-up table stored in a memory of the control module.

A method according to another exemplary aspect of the present disclosure includes, among other things, during a parked condition of a vehicle equipped with a windshield wiper system, automatically controlling a windshield wiper of the windshield wiper system at a pre-calculated wiping interval rate that is based at least on an interior temperature of the vehicle.

In a further non-limiting embodiment of the forgoing method, the method includes monitoring a surface of the vehicle for precipitation, monitoring an ambient temperature associated with the vehicle, and automatically moving the windshield wiper from a rest position to a parked position when the precipitation is detected and the ambient temperature is below a predefined ambient temperature threshold.

In a further non-limiting embodiment of either of the forgoing methods, the monitoring and the automatically moving to the parked positon are performed prior to automatically controlling the windshield wiper at the pre-calculated wiping interval rate.

In a further non-limiting embodiment of any of the forgoing methods, the method includes monitoring the interior temperature of the vehicle, and automatically reducing the pre-calculated wiping interval rate when the interior temperature of the vehicle decreases.

In a further non-limiting embodiment of any of the forgoing methods, the method includes holding the windshield wiper at a parked position when the interior temperature falls below an interior temperature threshold.

In a further non-limiting embodiment of any of the forgoing methods, the method includes automatically moving the windshield wiper to a parked position after a predefined amount of time has passed since automatically controlling the windshield wiper at the pre-calculated wiping interval rate.

In a further non-limiting embodiment of any of the forgoing methods, the method includes automatically moving the windshield wiper to a rest position when a state of charge of a power source of the windshield wiper system falls below a predefined minimum state of charge.

In a further non-limiting embodiment of any of the forgoing methods, the pre-calculated wiping interval rate is correlated to the interior temperature of the vehicle within a look-up table that is stored in a memory of a control module of the windshield wiper system.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle windshield wiper systems and methods for controlling windshield wipers in a manner that reduces the buildup of frozen precipitation on the vehicle windshield. In exemplary embodiments, a windshield wiper can be automatically commanded to wipe a windshield at a pre-calculated wiping interval rate when precipitation is detected on a vehicle surface, a vehicle ambient temperature is below a predefined ambient temperature threshold, and a vehicle interior temperature exceeds a predefined interior temperature threshold. These and other features of this disclosure are described in greater detail below.

Figure 1:
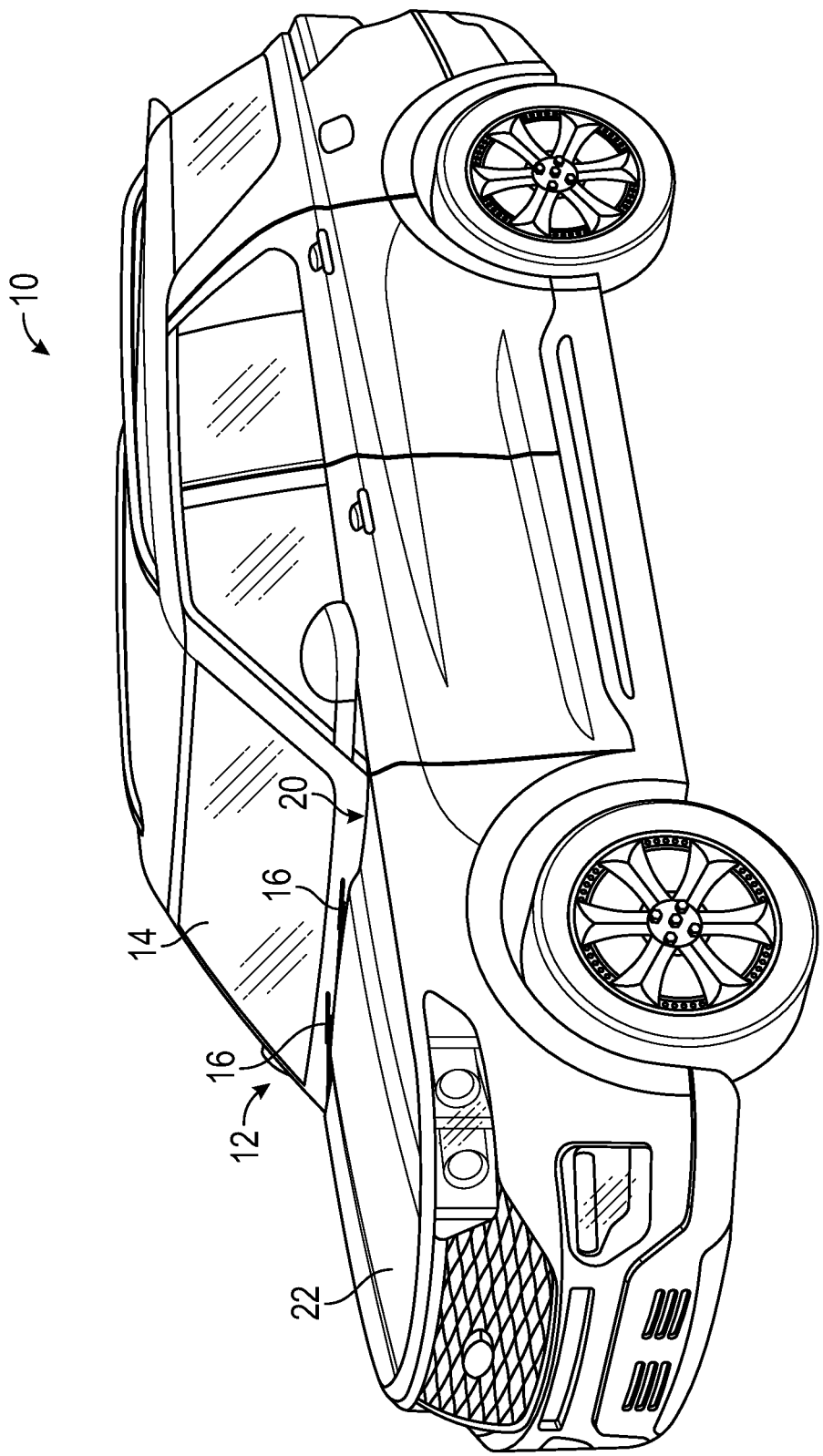
FIG. 1 illustrates a vehicle equipped with a windshield wiper system.

FIG. 1 schematically illustrates a vehicle 10. The vehicle 10 could be a car, a truck, a van, a sport utility vehicle, or any other type of vehicle. The vehicle 10 could also be a conventional, internal combustion engine powered vehicle, a traction battery powered hybrid electric vehicle (HEV), a plug-in hybrid electric vehicle (PHEV), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a windshield wiper system 12. The windshield wiper system 12 is capable of wiping away precipitation that may accumulate on a windshield 14 or other window of the vehicle 10. The windshield 14 could be either a front or rear windshield of the vehicle 10. The windshield wiper system 12 may be a single arm, tandem, opposed dual, or any other type of windshield wiper system. Therefore, the windshield wiper system 12 could include one or more windshield wipers 16.

The windshield wipers 16 are configured to move relative to the windshield 14. With continued reference to FIG. 1, the windshield wipers 16 of the windshield wiper system 12 are shown in a rest position P1 in FIG. 2 and in a parked position P2 in FIG. 3. In the rest position P1, the windshield wipers 16 are oriented along a bottom edge 18 of the windshield 14 and may be stationed at least partially within a cowl area 20 that extends between the bottom edge 18 of the windshield 14 and a hood 22 (see FIG. 1) of the vehicle 10. In the parked position P2, the windshield wipers 16 are oriented transversely relative to a Z-axis 24 (i.e., a vertical axis) of the vehicle 10. The windshield wipers 16 may be automatically moved from the rest position P1 to the parked position P2 when there is a threat of freezing precipitation, for example.

Figure 2:
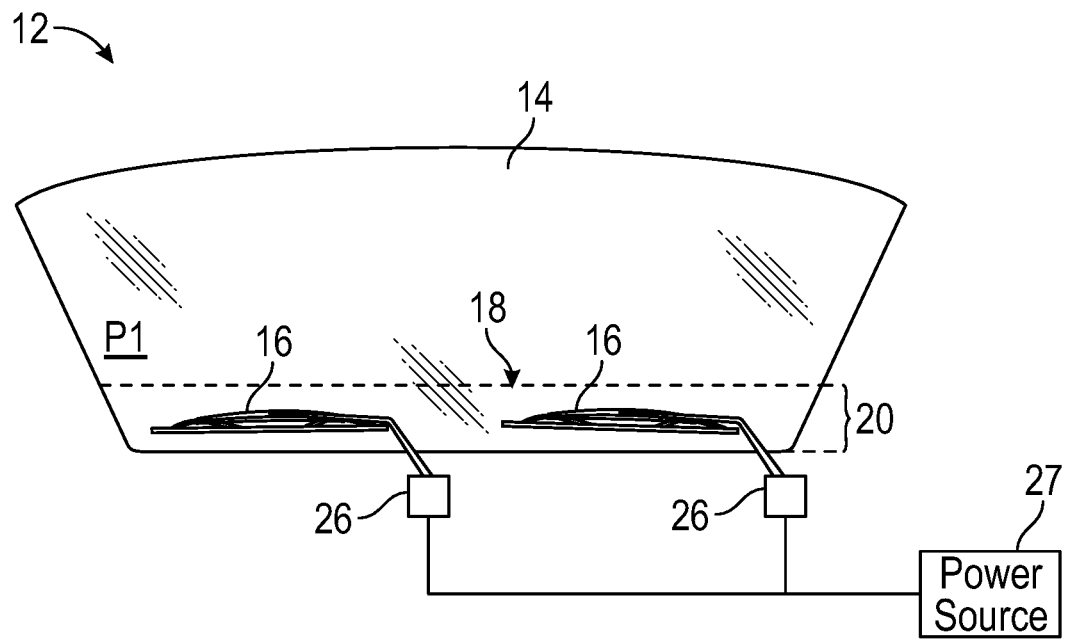
FIG. 2 illustrates a rest position of a windshield wiper of the windshield wiper system of FIG. 1.
Figure 3:
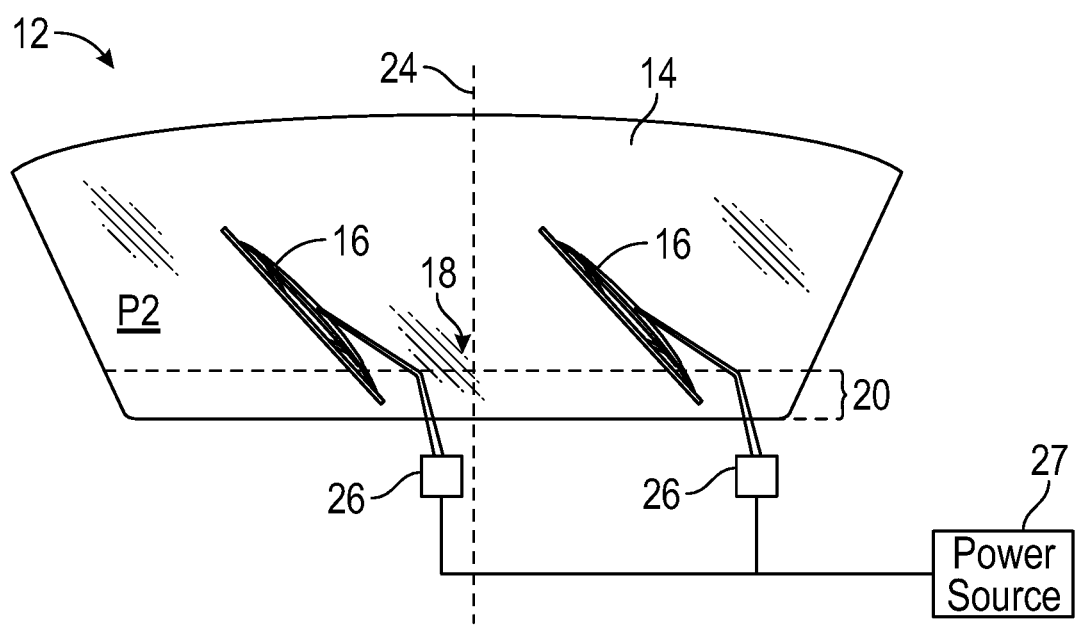
FIG. 3 illustrates a parked position of a windshield wiper of the windshield wiper system of FIG. 1.

The windshield wiper system 12 may include one or more wiper actuators 26 for moving the windshield wipers 16 between the rest positon P1 of FIG. 2 and the parked positon P2 of FIG. 3. The wiper actuators 26 may be powered by one or more power sources 27, such as a dedicated battery, a low voltage battery of the vehicle 10, a high voltage traction battery of the vehicle 10, etc.

The windshield wiper system 12 shown in FIGS. 1-3 and described in the preceding paragraphs is but one example of how windshield wipers could be configured and arranged for wiping precipitation from the windshield 14. A person of ordinary skill in the art would understand that other windshield wiper configurations and arrangements are possible. Accordingly, it should be appreciated that the specific windshield wiper arrangement of FIGS. 1-3 is not intended to limit this disclosure.

Figure 4:
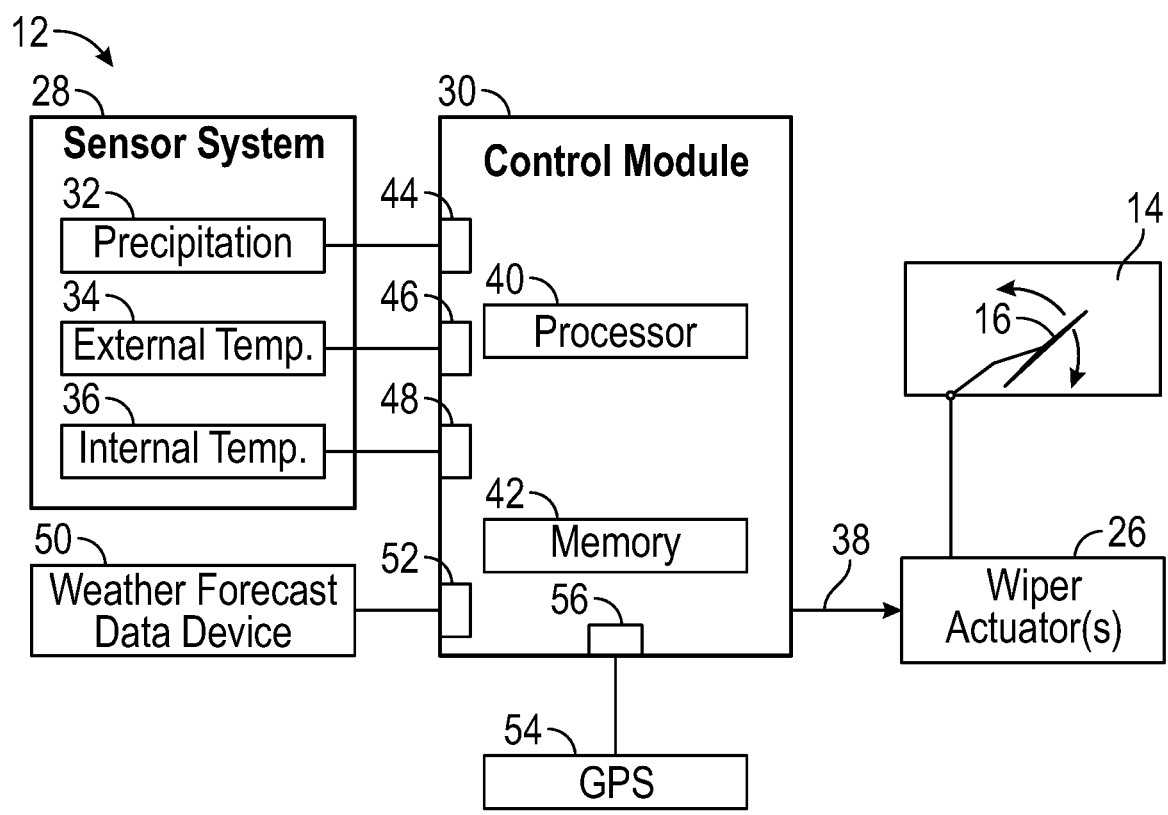
FIG. 4 is a block diagram of an exemplary windshield wiper system.

FIG. 4, with continued reference to FIGS. 1-3, schematically illustrates an exemplary windshield wiper system 12. The windshield wiper system 12 may be employed to automatically park the windshield wiper 16 higher when needed and to automatically reduce the buildup of frozen precipitation on the windshield 14. In this disclosure, the term "automatically" denotes an action that occurs without any required input from a user of the vehicle 10 other than enabling an automatic wiper mode of the windshield wiper system 12.

The windshield wiper system 12 may include a sensor system 28, a control module 30, one or more windshield wipers 16, and one or more wiper actuators 26. The sensor system 28 may include a plurality of sensors that provide input signals to the control module 30. The plurality of sensors of the sensor system 28 may include temperature sensors, humidity sensors, light refraction sensors, proximity sensors, capacitive sensors, or any combination of these sensors.

In an embodiment, the sensor system 28 includes a precipitation sensor 32 configured to detect the presence of moisture (e.g., rain, snow, ice, etc.) on a surface (e.g., the windshield 14) of the vehicle 10, an external temperature sensor 34 configured to sense the ambient temperature of the environment surrounding the vehicle 10, and an internal temperature sensor 36 configured to sense the temperature inside a passenger cabin of the vehicle 10. The precipitation sensor 32 may be positioned within or near the windshield 14 or any other window of the vehicle 10. The external temperature sensor 34 and the internal temperature sensor 36 may be positioned at any location of the vehicle 10.

Once precipitation has been detected by the precipitation sensor 32 of the sensor system 28, the windshield wiper(s) 16 can be automatically controlled in ways that effectively maintain the windshield 14 clear of snow and ice buildup. As discussed in greater detail below, for example, the windshield wiper 16 can be automatically parked in the parked position P2 and automatically controlled at a pre-calculated wiping interval rate to keep the windshield 14 free of frozen precipitation.

The control module 30 may control the windshield wiper 16 by applying command signals 38 to the wiper actuator 26, such as for moving the windshield wiper 16 at the pre-calculated wiping interval rate. Although schematically illustrated as a single controller, the control module 30 may be part of a vehicle control system that includes a plurality of additional control modules for interfacing with and commanding operation of the various components of the vehicle 10. In an embodiment, the control module 30 is part of a body control module (BCM) of the vehicle 10.

In an embodiment, the control module 30 includes a processing unit 40 and non-transitory memory 42 for executing the various control strategies of the windshield wiper system 12. As discussed below, the control module 30 may receive and process various inputs to control the windshield wiper 16 in a desired manner for reducing the accumulation of frozen precipitation on the windshield 14.

A first input 44 to the control module 30 may include precipitation signals from the precipitation sensor 32 of the sensor system 28. The precipitation signals indicate that precipitation (e.g., rain, snow, or ice) has been detected on the vehicle 10.

A second input 46 to the control module 30 may include ambient temperature signals from the external temperature sensor 34 of the sensor system 28. The ambient temperature signals indicate the current ambient temperature of the environment surrounding the vehicle 10. The control module 30 may utilize the ambient temperature signals to infer whether the precipitation that has been detected by the precipitation sensor 32 is rain or snow/ice (i.e., freezing precipitation).

A third input 48 to the control module 30 may include internal temperature signals from the internal temperature sensor 36. The internal temperature signals indicate the current temperature inside the passenger cabin of the vehicle 10. The control module 30 may utilize the internal temperature signals to determine whether the passenger cabin, and therefore the windshield 14, has sufficiently cooled such that the windshield 14 is no longer capable of melting frozen precipitation on the windshield 14. It is generally undesirable for the windshield 14 to melt the frozen precipitation only to have the precipitation refreeze as ice on the windshield 14 shortly thereafter due to relatively cold ambient temperatures.

The windshield wiper system 12 may optionally include a weather forecast data device 50 that is configured to provide a fourth input 52 to the control module 30. The fourth input 52 may include live weather forecast signals at the location of the vehicle 10. The location of the vehicle 10 may optionally be detected by a global positioning system (GPS) 54, which may provide a fifth input 56 to the control module 30 that includes location signals. The live weather forecast signals and the location signals can be utilized by the control module 30 to infer a total amount of time that the vehicle 10 is likely to be parked at its current location. This data can then be used by the control module 30 to more accurately calculate a desirable wiping interval rate of the windshield wiper 16 for keeping the windshield 14 free of frozen precipitation during the estimated time the vehicle 10 is likely to be parked.

The processing unit 40 of the control module 30, in an embodiment, is configured to execute one or more programs stored in the memory 42 of the control module 30. For example, a first exemplary program, when executed, may determine when to command the wiper actuator 26 to move the windshield wiper 16 to the parked position P2. In an embodiment, the control module 30 controls the positioning of the windshield wiper 16 based on whether precipitation has been detected on the vehicle 10 by the precipitation sensor 32 and based on whether an ambient temperature detected by the external temperature sensor 34 is below a predefined temperature threshold.

A second exemplary program, when executed, may determine/estimate the wiping interval rate and wiping duration necessary for wiping the windshield 14 with the windshield wiper 16 in order to keep the windshield 14 free of frozen precipitation when the vehicle interior temperature exceeds a predefined temperature threshold. In an embodiment, the control module 30 controls the windshield wiper 16 at a pre-calculated wiping interval rate that is based on a precipitation rate detected by the precipitation sensor 32 and the internal temperature detected by the internal temperature sensor 36. As the vehicle interior temperature cools, the wiping interval rate may be automatically decreased because the precipitation will take longer to melt and freeze on the windshield 14.

A pre-calculated wiping interval rate that corresponds to each possible detected vehicle interior temperature may be stored in the memory 42 of the control module 30, such as in one or more look-up tables. The control module 30 can accurately estimate the correct pre-calculated wiping interval rate that should be used for any given vehicle interior temperature by referencing the look-up table. Once the internal temperature of the vehicle 10 decreases to a point at which it equals the exterior temperature of the vehicle 10, the windshield wiper 16 may be returned to the parked position P2 and may only be subsequently engaged to clear relatively large amounts of snow build-up.

Figure 5:
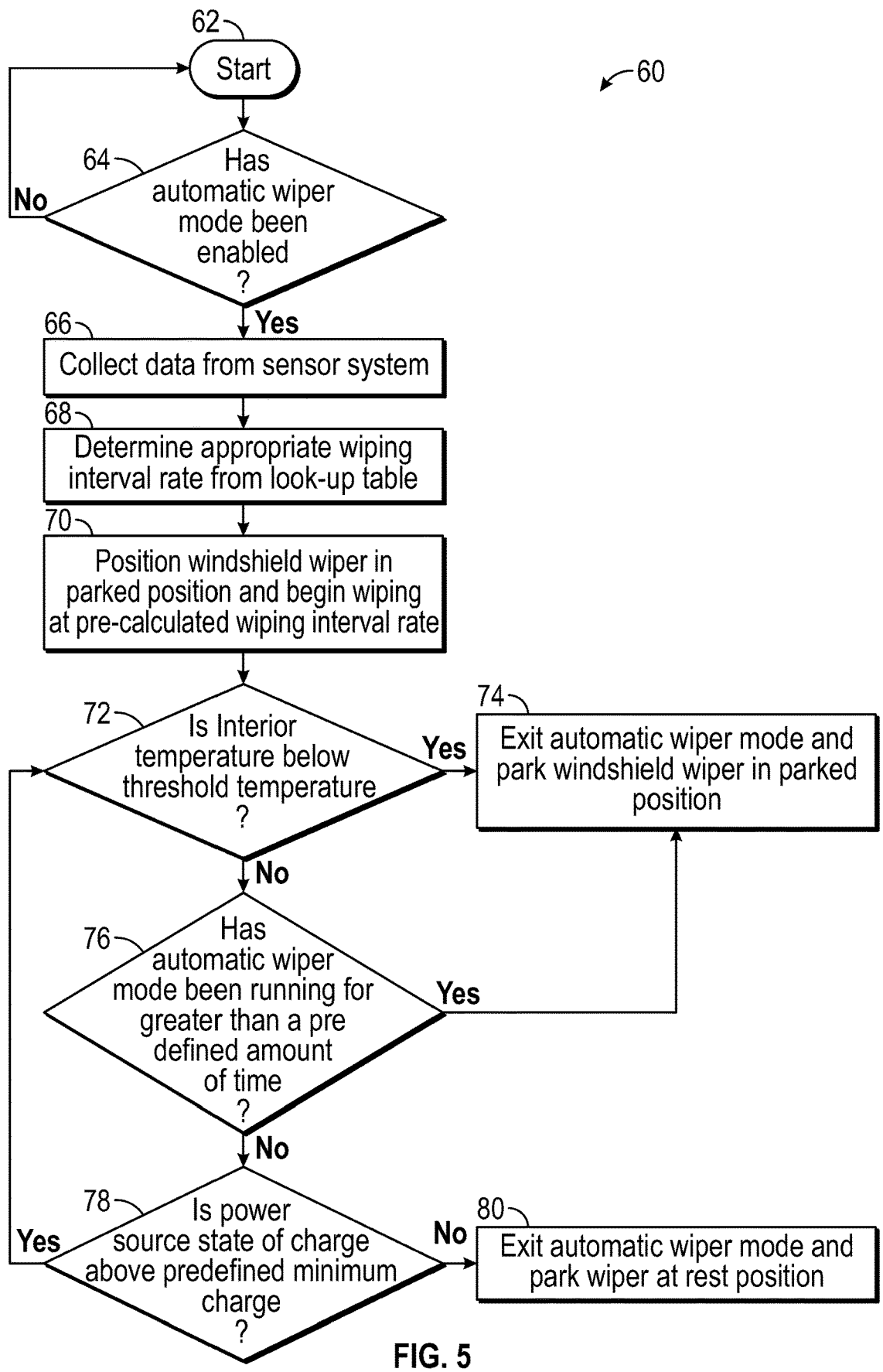
FIG. 5 schematically illustrates an exemplary method for controlling a vehicle windshield wiper system in a manner that reduces the buildup of precipitation on the vehicle windshield when the vehicle is parked.

FIG. 5, with continued reference to FIGS. 1-4, schematically illustrates a method 60 for controlling the windshield wiper system 12 in a manner that reduces the accumulation of frozen precipitation on the windshield 14. In an embodiment, the control module 30 of the windshield wiper system 12 is programmed with one or more algorithms adapted to execute the exemplary method 60.

The exemplary method 60 begins at block 62. At block 64, the control module 30 may determine whether an automatic wiper mode of the windshield wiper system 12 has been enabled by the owner/user of the vehicle 10. The automatic wiper mode indicates that the user of the vehicle 10 wishes to keep the windshield free of frozen precipitation when the vehicle 10 is parked and not in use. The automatic wiper mode may be enabled from a vehicle infotainment system located within the passenger cabin of the vehicle 10, such as by toggling a button or touch-screen widget, for example.

If the automatic wiper mode is enabled, the method 60 may continue to block 66 where the control module 30 collects data from the sensor system 28. The data collected by the control module 30 may include precipitation signals from the precipitation sensor 32, ambient temperature signals from the external temperature sensor 34, and internal temperature signals from the internal temperature sensor 36. Weather forecast data from the weather forecast data device 50 and location data from the GPS 54 may optionally be gathered by the control module 30 during block 66. This data may be used to determine whether the windshield wipers 16 should be controlled in a certain manner to prevent the buildup of frozen precipitation during the period of time for which the vehicle 10 is expected to be parked.

Next, at block 68, the control module 30 may determine an appropriate wiping interval rate for wiping the windshield 14 with the windshield wipers 16 during the automatic wiper mode. The wiping interval rate may be based on the precipitation rate detected by the precipitation sensor 32 and the internal temperature detected by the internal temperature sensor 36. The appropriate wiping interval rate may be obtained from a look-up table stored in the memory 42 of the control module 30.

The control module 30 automatically commands the wiper actuator 26 to position the windshield wiper 16 in the parked position P2 and begin wiping at the pre-calculated wiping interval rate at block 70. Wiping may continue at the pre-calculated wiping interval rate until the vehicle interior has cooled enough that it becomes unlikely that the rain/snow will melt and then refreeze on the windshield 14.

The control module 30 may subsequently determine whether the vehicle internal temperature is below a predefined temperature threshold (e.g., below approximately 32° F./0° C.) at block 72. The control module 64 may analyze signals periodically received from the internal temperature sensor 36 of the sensor system 28 to determine whether the interior temperature is below a predefined temperature threshold. If YES, the control module 30 may exit the automatic wiper mode and command the windshield wipers 16 to the parked position P2 at block 74.

If block 72 returns a NO flag, the method 60 may proceed to block 76. At this step, the control module 30 may determine whether the automatic wiper mode has been running for greater than a predefined amount of time (e.g., two hours, although the predefined amount of time could be set at any amount of time). If YES, the control module 30 may exit the automatic wiper mode and command the windshield wipers 16 to the parked position P2 at block 74.

If block 76 returns a NO flag, the method 60 may proceed to block 78. At this step, the control module 30 may determine whether a state of charge of the power source 27 that powers the wiper actuator 26 for moving the windshield wipers 16 is above a predefined minimum state of charge. If YES, the method 60 returns to block 72. However, if a NO flag is returned at block 78, the control module 30 may exit the automatic wiper mode and command the windshield wipers 16 to the rest position P1 at block 80.

The vehicle windshield wiper systems described herein maintain the windshield free of snow/ice buildup by controlling the windshield wipers based on sensor data to actively prevent the buildup. The systems and methods of this disclosure improve the overall user experience by substantially eliminating the need to manually scrape the windshield and the buildup of snow/ice within the windshield cowl area.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A windshield wiper system, comprising:
a windshield wiper;
a sensor system configured to (1) detect precipitation on a vehicle surface, (2) monitor a vehicle ambient temperature, and (3) monitor a vehicle interior temperature; and
a control module configured to automatically command the windshield wiper to wipe at a pre-calculated wiping interval rate when the precipitation is detected on the vehicle surface, the vehicle ambient temperature is below a predefined ambient temperature threshold, and the vehicle interior temperature exceeds a predefined interior temperature threshold.

2. The windshield wiper system as recited in claim 1, wherein the vehicle surface is a front or rear windshield.

3. The windshield wiper system as recited in claim 1, wherein the sensor system includes a precipitation sensor configured to detect the precipitation, an external temperature sensor configured to detect the vehicle ambient temperature, and an internal temperature sensor configured to detect the vehicle interior temperature.

4. The windshield wiper system as recited in claim 3, wherein the internal temperature sensor is configured to sense the temperature inside a vehicle passenger cabin.

5. The windshield wiper system as recited in claim 1, comprising a wiper actuator for moving the windshield wiper at the pre-calculated wiping interval rate and a power source for powering the wiper actuator.

6. The windshield wiper system as recited in claim 1, wherein the control module is configured to automatically command movement of the windshield wiper from a rest position to a parked position when the precipitation is detected on the vehicle surface and the vehicle ambient temperature is below a predefined ambient temperature threshold.

7. The windshield wiper system as recited in claim 1, wherein the control module is configured to automatically reduce the pre-calculated wiping interval rate as the vehicle interior temperature decreases.

8. The windshield wiper system as recited in claim 1, comprising a weather forecast data device configured to provide live weather forecast data to the control module.

9. The windshield wiper system as recited in claim 1, comprising a global positioning system (GPS) configured to provide vehicle location data to the control module.

10. The windshield wiper system as recited in claim 1, wherein the windshield wiper includes multiple windshield wipers.

11. The windshield wiper system as recited in claim 1, wherein the pre-calculated wiping interval rate is based on the vehicle interior temperature.

12. The windshield wiper system as recited in claim 1, wherein the pre-calculated wiping interval rate is based on a precipitation rate detected by a precipitation sensor of the sensor system.

13. The windshield wiper system as recited in claim 1, wherein the pre-calculated wiping interval rate is correlated to the vehicle interior temperature in a look-up table stored in a memory of the control module.

14. The windshield wiper system as recited in claim 1, wherein the vehicle interior temperature is a vehicle interior passenger cabin temperature.

15. The windshield wiper system as recited in claim 1, wherein the control module is configured to utilize the vehicle interior temperature to infer whether a vehicle passenger cabin has sufficiently cooled such that a windshield is no longer capable of melting frozen precipitation on the windshield.

16. The windshield wiper system as recited in claim 1, wherein the control module is configured to automatically command the windshield wiper to wipe at the pre-calculated wiping interval rate during a parked condition of a vehicle that is equipped with the windshield wiper system.

17. The windshield wiper system as recited in claim 1, wherein the control module is configured to automatically command the windshield wiper to a parked position after a predefined amount of time has passed since automatically controlling the windshield wiper at the pre-calculated wiping interval rate.

18. The windshield wiper system as recited in claim 17, wherein the control module is configured to automatically command movement of the windshield wiper to a rest position when a state of charge of a power source of the windshield wiper system falls below a predefined minimum state of charge.

19. The windshield wiper system as recited in claim 1, wherein the control module is configured to automatically command movement of the windshield wiper to a parked position when the vehicle interior temperature equals the vehicle ambient temperature.

20. A windshield wiper system, comprising:
   a windshield wiper;
   a sensor system configured to monitor a vehicle interior passenger cabin temperature; and
   a control module configured to control a wiping interval rate of the windshield wiper based at least in part on the vehicle interior passenger cabin temperature.

\* \* \* \* \*